United States Patent
Bowers et al.

(10) Patent No.: US 10,430,592 B2
(45) Date of Patent: *Oct. 1, 2019

(54) INTEGRITY CHECKING FOR COMPUTING DEVICES

(71) Applicant: Federal Reserve Bank of Philadelphia, Philadelphia, PA (US)

(72) Inventors: Bradley C. Bowers, Wenonah, NJ (US); Keith Morales, Wynnewood, PA (US); George C. Makin, V, Philadelphia, PA (US); Abraham Vegh, Philadelphia, PA (US)

(73) Assignee: Federal Reserve Bank of Philadelphia, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,769

(22) Filed: May 24, 2018

(65) Prior Publication Data
US 2018/0276391 A1  Sep. 27, 2018

Related U.S. Application Data

(63) Continuation of application No. 14/946,241, filed on Nov. 19, 2015, now Pat. No. 10,019,580.

(51) Int. Cl.
*G06F 21/57* (2013.01)

(52) U.S. Cl.
CPC ................................. *G06F 21/577* (2013.01)

(58) Field of Classification Search
CPC . H04L 63/061; H04L 2209/42; H04L 9/0822; H04L 63/0807; H04L 63/123; H04L 9/3247; H04L 63/10; H04L 63/0853; G06F 21/577; G06F 21/6218; G06F 21/575; G06F 21/71; G06F 21/78; G06F 3/0605; G06F 3/0632; G06F 3/0679; G06F 8/65; G06F 8/665; G06F 21/33;
(Continued)

(56) References Cited

U.S. PATENT DOCUMENTS

| 4,941,089 A | 7/1990 | Fischer et al. |
| 7,134,006 B2 | 11/2006 | Flanigan et al. |

(Continued)

*Primary Examiner* — Jason K Gee
*Assistant Examiner* — Shu Chun Gao
(74) *Attorney, Agent, or Firm* — Condo Roccia Koptiw LLP

(57) ABSTRACT

A computing device may perform integrity checks on a closed operating system defining a preconfigured user portion and a preconfigured system portion using an integrity checking module. The integrity checking module may access parameters associated with an object stored on the system portion of the operating system. Files on the system portion may be accessed by submitting a query that comprises a file name, a file directory, and at least one parameter to the system portion of the operating system. The integrity checking module may provide an indication of a potential compromise to the integrity of the computing device based on the integrity check. The integrity check may be performed periodically and/or aperiodically. Updated integrity values may be compared against previously determined integrity values to update the integrity check. The integrity checking module may perform the integrity check using a signature function or hashing function to generate the integrity values.

20 Claims, 11 Drawing Sheets

(58) Field of Classification Search
CPC .... G06F 21/572; G06F 9/4411; G06F 3/0607; G06F 2221/031; G06F 2221/2153; G06F 11/1433; G06F 11/1004; G06F 2201/865; G01N 33/48792

See application file for complete search history.

(56) References Cited

U.S. PATENT DOCUMENTS

| | | | | |
|---|---|---|---|---|
| 7,210,147 | B1* | 4/2007 | Hipp | H04L 12/4641 718/1 |
| 7,243,347 | B2 | 7/2007 | Palmer et al. | |
| 7,480,907 | B1 | 1/2009 | Marolia et al. | |
| 8,176,336 | B1* | 5/2012 | Mao | H04L 9/006 713/189 |
| 9,025,951 | B2* | 5/2015 | Baykal | H04L 12/2881 398/22 |
| 9,390,267 | B2* | 7/2016 | Mooring | G06F 9/45545 |
| 9,749,335 | B2 | 8/2017 | Boone et al. | |
| 2004/0128542 | A1* | 7/2004 | Blakley, III | H04L 63/0281 726/12 |
| 2006/0104252 | A1* | 5/2006 | Song | H04L 63/0272 370/338 |
| 2009/0271533 | A1* | 10/2009 | Asnaashari | G06F 3/0605 710/13 |
| 2012/0311322 | A1* | 12/2012 | Koyun | G06Q 20/3227 713/156 |
| 2013/0125204 | A1 | 5/2013 | La et al. | |
| 2013/0227540 | A1 | 8/2013 | Ruster et al. | |
| 2014/0016650 | A1* | 1/2014 | Chai | H04L 45/02 370/431 |
| 2014/0304520 | A1 | 10/2014 | Bobzin et al. | |
| 2014/0325644 | A1 | 10/2014 | Oberg et al. | |
| 2015/0163121 | A1 | 6/2015 | Mahaffey et al. | |
| 2015/0200934 | A1 | 7/2015 | Naguib et al. | |
| 2015/0244710 | A1* | 8/2015 | Koster | G06F 21/44 713/171 |
| 2016/0036814 | A1 | 2/2016 | Conrad et al. | |
| 2016/0050213 | A1 | 2/2016 | Storr et al. | |
| 2016/0080337 | A1* | 3/2016 | Pahl | H04L 9/085 713/171 |
| 2016/0259944 | A1* | 9/2016 | Okihara | G06F 21/31 |
| 2017/0177866 | A1* | 6/2017 | Hentunen | G06F 21/563 |
| 2018/0013738 | A1* | 1/2018 | Yoo | H04L 9/3247 |
| 2018/0189484 | A1* | 7/2018 | Danahy | G06F 21/554 |

\* cited by examiner

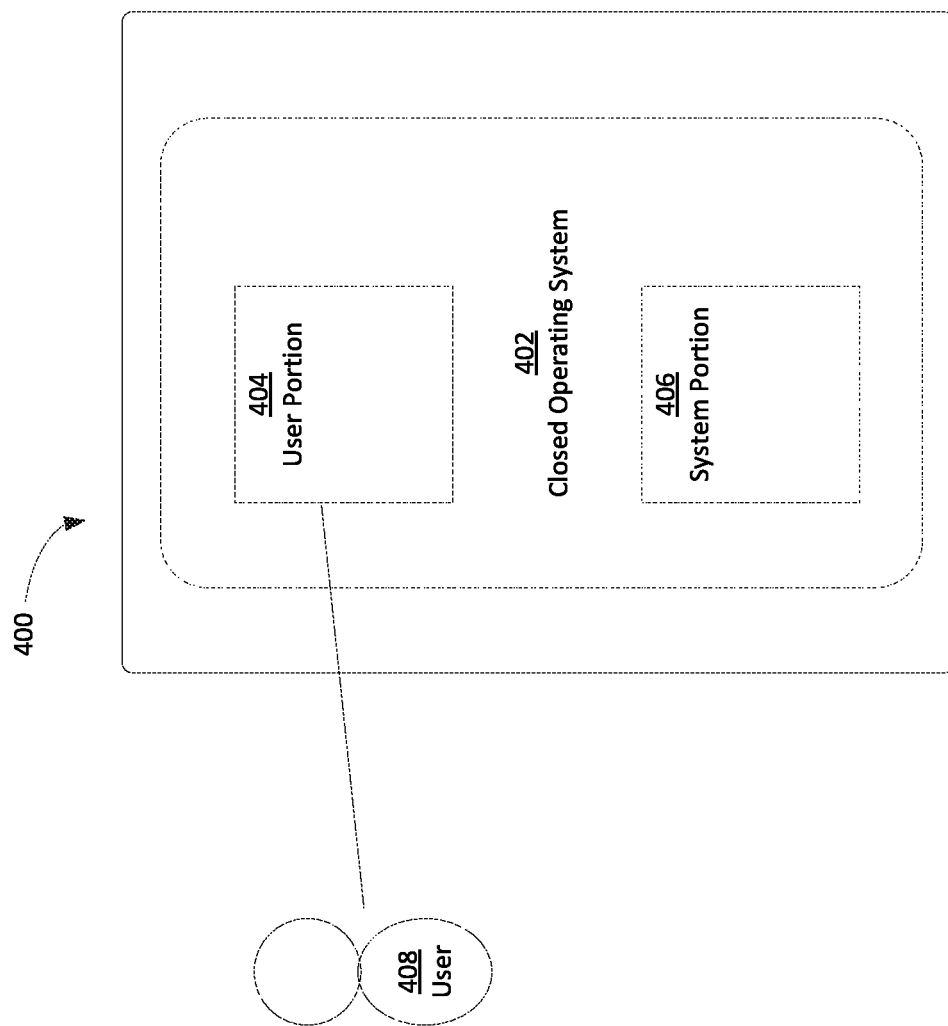

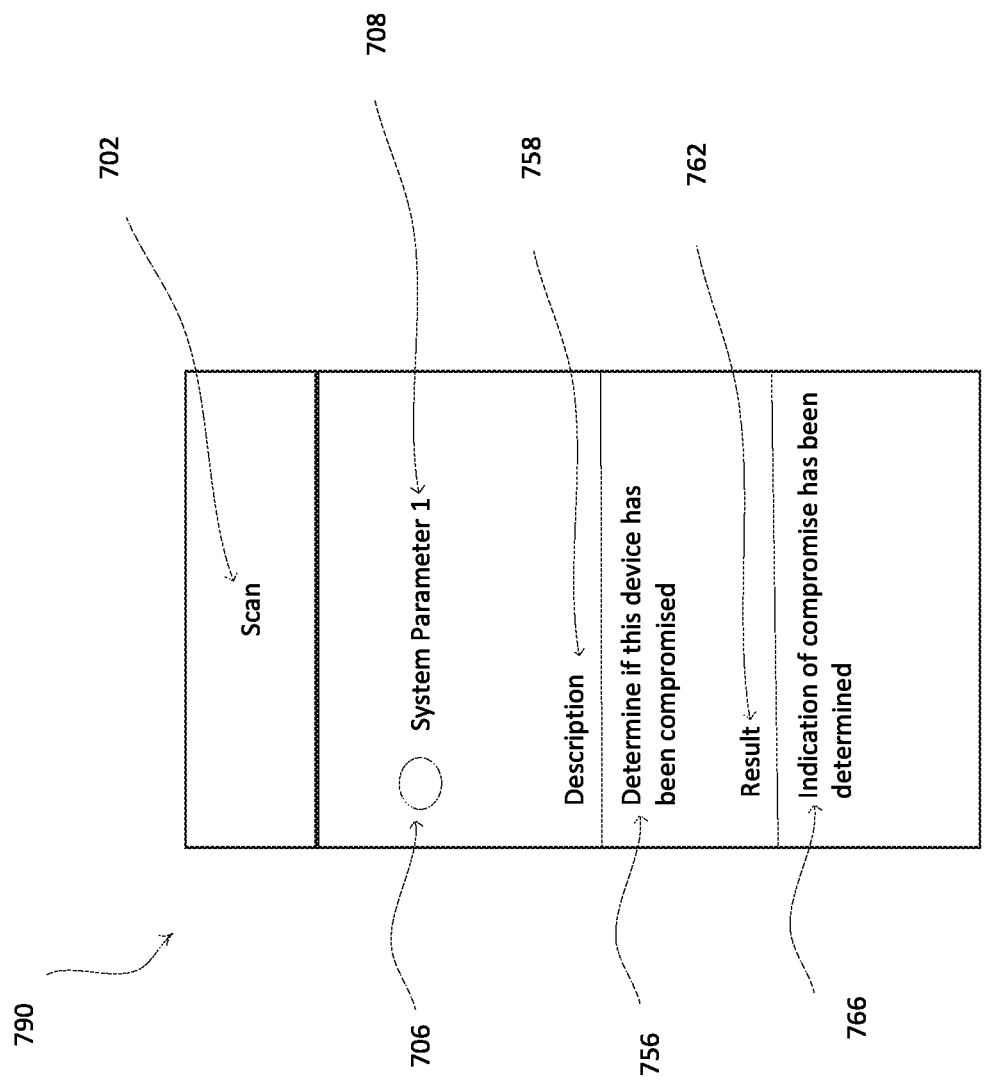

INTEGRITY CHECKING FOR COMPUTING DEVICES

CROSS-REFERENCE TO RELATED APPLICATIONS

This application is based on and claims priority to U.S. patent application Ser. No. 14/946,241, filed on Nov. 19, 2015 the contents of which are hereby incorporated by reference in their entirety.

BACKGROUND

The use of mobile devices has gained popularity in recent years and has proven useful in facilitating communication among parties. As the amount of mobile device storage continues to rise, and the frequency of data being transmitted by mobile devices continues to increase, more information is becoming accessible via the mobile device. Information being accessed on the mobile devices may include sensitive information, such as information belonging to organizations, financial information, confidential information, etc.

The increase of information being accessed by mobile devices is creating a larger risk for intrusions or compromises on the mobile devices in an attempt to access such information. The storage and transfer of information via mobile devices creates a risk of potential unauthorized access and/or unauthorized use of the information. For this reason, additional securities may be desired on mobile devices to assist in determining whether the integrity of the mobile device has been compromised.

Detecting the integrity of a mobile device may be difficult, as mobile devices may operate using different types of operating systems that allow different types of access to system files on the mobile device. Third party software developers may have a limited application programming interface (API) to enable access to a limited amount of information on the mobile device. Some mobile devices may be running open operating systems (e.g., Microsoft Windows®, Android, etc.) that may permit third party software (e.g., anti-virus software, etc.) access system information to detect the download and/or presence of unauthorized software (e.g., malware, as well as other types of software) on the mobile device. Other mobile devices may be running closed operating systems that make it difficult to access to system information that may be desirable to identify the integrity of the mobile device. Thus, users of the mobile device may have to rely on the device provider to prevent, detect, and/or remove threats to the integrity of the mobile device, which may be insecure.

SUMMARY

A computing device may operate having a closed operating system. The closed operating system may define a preconfigured user portion and a preconfigured system portion. The closed operating system may restrict user access to system objects (e.g., folders, files, processes, memory, file attributes or metadata, etc.) in the preconfigured system portion. The computing device may access system objects (e.g., folders, files, processes, memory, file attributes or metadata, etc.) on the preconfigured system portion of the closed operating system using an integrity checking module on the preconfigured user portion of the operating system.

The integrity checking module may determine a predefined set of device integrity parameters. The set of device integrity parameters may include parameters associated with a file (e.g., a file stored on the system portion of the operating system) and/or parameters associated with system attributes. System attributes may include memory utilization, system processes, and/or the like.

The integrity checking module may perform a baseline integrity check based on the predefined set of device integrity parameters. The baseline integrity check may access the parameters associated with the file stored on the system portion of the operating system and/or parameters associated with system attributes by submitting a query that comprises a file name, a file directory (e.g., drive, folder, file, extension, etc.), parameters to the system portion of the operating system, and/or the like. The integrity checking module may store the baseline integrity values of the predefined set of device integrity parameters resulting from the baseline integrity check at the preconfigured user portion of the closed operating system.

The integrity checking module may perform an integrity check based on the set of the device integrity parameters, or a subset thereof. The subset of the predefined set of device integrity parameters may include parameters associated with a file stored on the system portion of the operating system and/or parameters associated with system attributes. The integrity check may be configured to access the parameters associated with the file stored on the system portion of the operating system and/or parameters associated with system attributes by submitting the query that comprises the file name, the file directory, the parameters to the system portion of the operating system, and/or the like. The integrity checking module may compare integrity values associated with the integrity check with the baseline integrity values.

The integrity checking module may check multiple device integrity parameters. The multiple device integrity parameters may be weighted and/or combined to determine different levels of integrity. The weighting of the device integrity parameters may provide a range of integrity checking and may trigger integrity failures on a combination of potential threats to the integrity of the computing device.

The integrity checking module may provide an indication of a potential compromise to the integrity of the computing device based on the comparison of the values associated with the integrity check with the baseline integrity values. The integrity checking module may generate an integrity report that includes the result of the integrity check for one or more of the integrity parameters, a combination of the integrity parameters (e.g., weighted and/or unweighted parameters), and/or the integrity level of the computing device.

BRIEF DESCRIPTION OF THE DRAWINGS

FIGS. 4A-4B illustrate block diagrams of an example computing device having a closed operating system.

FIGS. 7A-7D depict example configurations of a user interface that may be generated for notifying a user of the integrity of a computing device.

DETAILED DESCRIPTION

Integrity checks may be performed on a computing device, such as a mobile computing device. Computing devices may include different types of operating systems. Some operating systems may be open operating systems, which may allow interrogation of the operating system to identify files and/or folders therein. Examples of open operating systems may include Microsoft Windows®, Linux®, Android®, as well as others. Some operating systems may be closed operating systems, which may disallow interrogation of the operating system to identify files and/or folders therein. Examples of closed operating systems may include the APPLE® iOS, as well as others.

Closed operating systems operating on a computing device may disallow interrogation of the operating system to identify files and/or folders therein. Accordingly, accessing information related to the files or folders therein for use in an application may be difficult. For example, integrity checking applications may desire information related to files or folders that may be inaccessible through interrogation of the operating system. The closed operating systems may allow a limited access to predefined information via an application programming interface (API). However, integrity checking applications may wish to access information that is in addition to the limited information allowed through the API.

Figure 1:
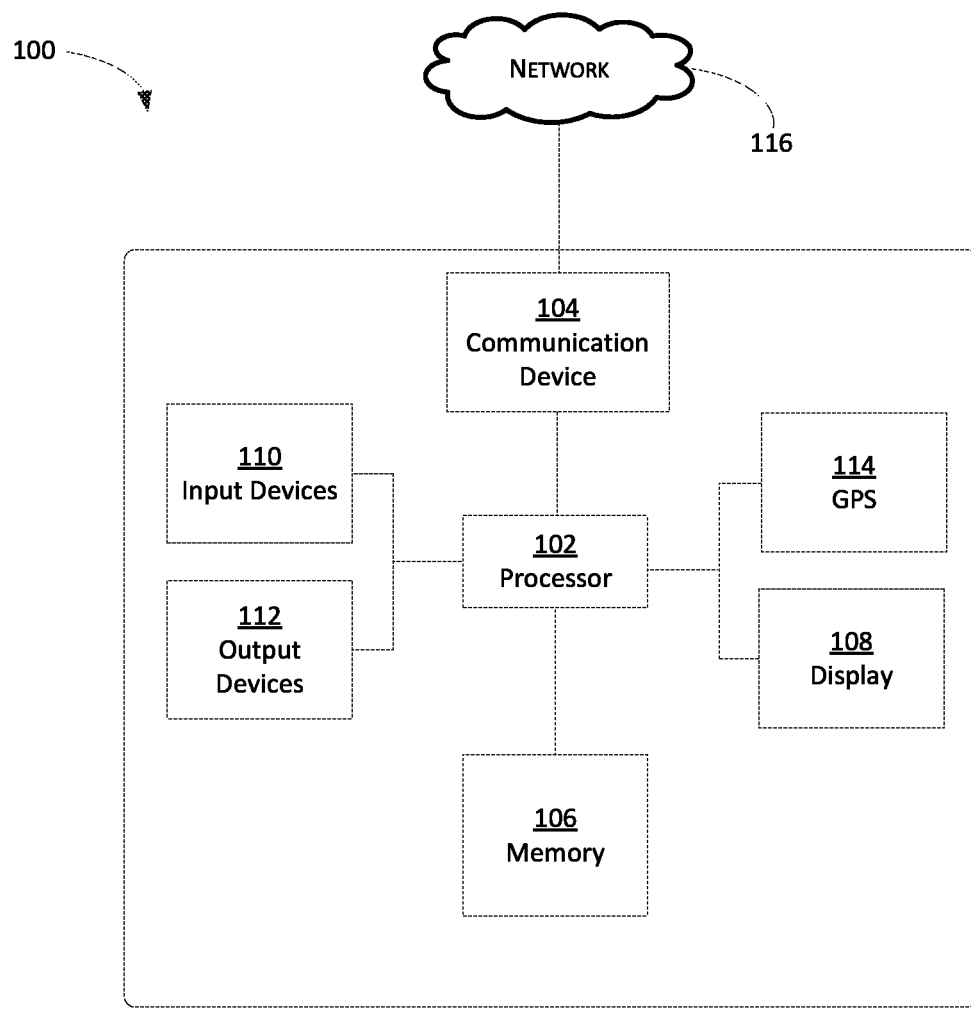
FIG. 1 illustrates a block diagram of an example computing device.

FIG. 1 depicts an exemplary computing device 100 on which integrity checking may be performed as described herein. The computing device 100 may be a mobile device, for example. The computing device 100 may include a personal computer, such as a laptop or desktop computer, a tablet device, a cellular phone or smartphone, a server, or another type of computing device.

The computing device 100 may include a processor 102, a communication interface 104, a memory 106, a display 108, input devices 110, output devices 112, and/or a GPS circuit 114. The computing device 100 may include additional, different, or fewer components.

The processor 102 may include one or more general purpose processors, special purpose processors, conventional processors, digital signal processors (DSPs), microprocessors, integrated circuits, a programmable logic device (PLD), application specific integrated circuits (ASICs), and/or the like. The processor 102 may perform signal coding, data processing, image processing, power control, input/output processing, and/or any other functionality that enables the computing device 100 to perform as described herein.

The processor 102 may store information in and/or retrieve information from the memory 106. The memory 106 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory may be local memory or remote memory external to the computing device 100. The memory 106 may store instructions which are executable by the processor 102. Different information may be stored in different locations in the memory 106.

The processor 102 may communicate with other devices via the communication device 104. The communication device 104 may transmit and/or receive information over the network 116, which may include one or more other computing devices. The communication device 104 may perform wireless and/or wired communications. The communication device 104 may include a receiver, transmitter, transceiver, or other device capable of performing wireless communications via an antenna. The communication device 104 may be capable of communicating via one or more protocols, such as a cellular communication protocol, a Wi-Fi communication protocol, Bluetooth®, a near field communication (NFC) protocol, an internet protocol, another proprietary protocol, or any other radio frequency (RF) or communications protocol. The computing device 100 may include one or more communication devices 104.

The processor 102 may be in communication with a display 108 for providing information to a user. The information may be provided via a user interface on the display 108. The information may be provided as an image generated on the display 108. The display 108 and the processor 102 may be in two-way communication, as the display 106 may include a touch-screen device capable of receiving information from a user (e.g., indications of user selections) and providing such information to the processor 102.

The processor 102 may be in communication with a GPS circuit 114 for receiving geospatial information. The processor 102 may be capable of determining the GPS coordinates of the computing device 100 based on the geospatial information received from the GPS circuit 114. The geospatial information may be communicated to one or more other communication devices to identify the location of the computing device 100.

The processor 102 may be in communication with input devices 110 and/or output devices 112. The input devices 110 may include a camera, a mouse, a microphone, a keyboard or other buttons or keys, and/or other types of input devices for sending information to the processor 102. The display 108 may be a type of input device, as the display 108 may include touch-screen sensor capable of sending information to the processor 102. The output devices 112 may include speakers, indicator lights, or other output devices capable of receiving signals from the processor 102 and providing output (e.g., audio, visual, etc.) from the computing device 100. The display 108 may be a type of output device, as the display 108 may provide images or other visual display of information received from the processor 102.

Figure 2:
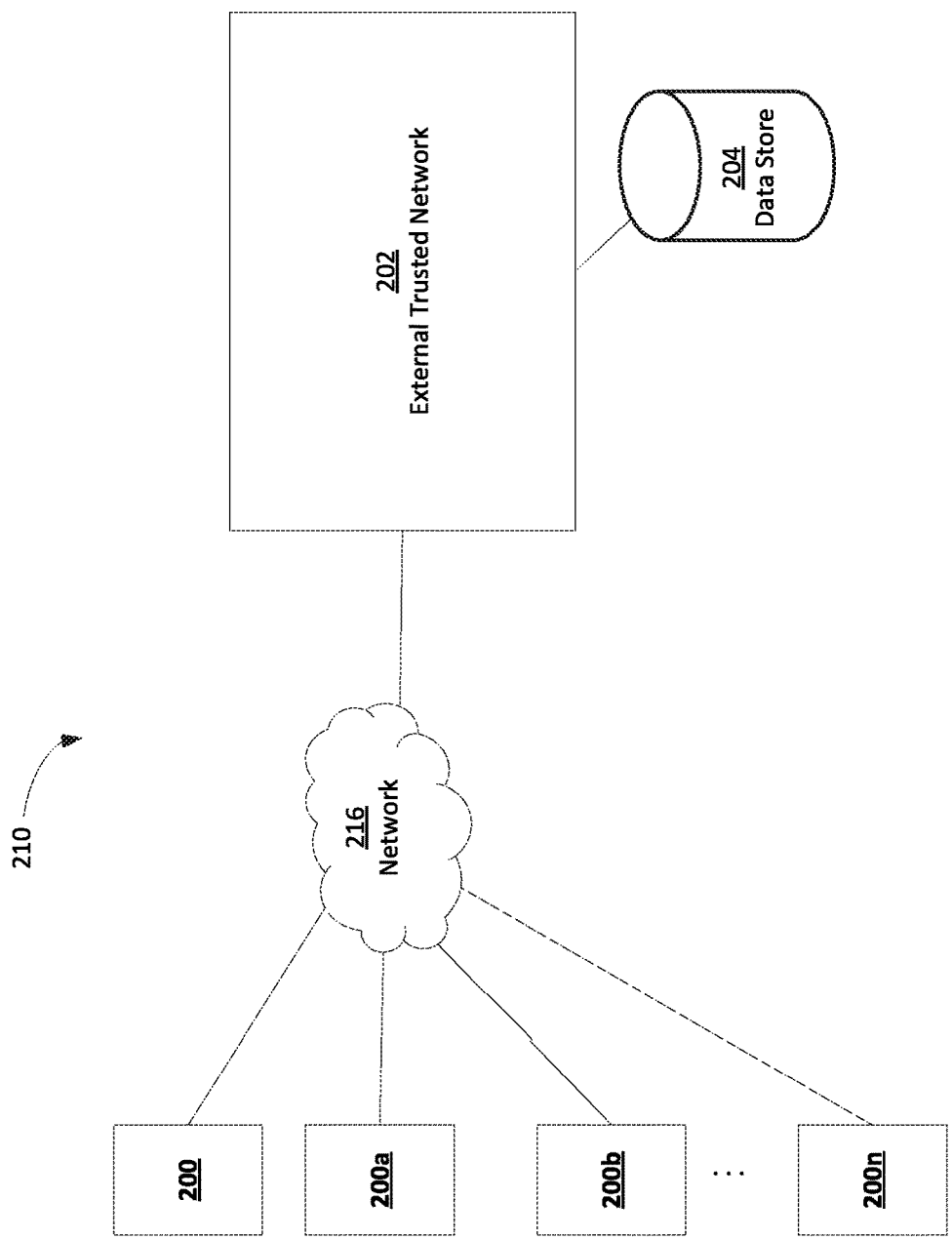
FIG. 2 illustrates a block diagram of an example system including computing devices and an external trusted network.

FIG. 2 illustrates a block diagram of a computing network system 210. The computing network system 210 may include one or more computing devices 200-200n that may be capable of communicating digital messages with one another, either directly or via a network 216. The network 216 may include a wired and/or wireless network. For example, the network 216 may include a Wi-Fi communication network, a Wi-MAX communication network, a cellular communication network (e.g., CDMA, HSPA+, LTE, etc.), and/or a television white space (TVWS) communication network. The network 216 may include one or more communication networks.

One or more computing devices 200-200n may be capable of communicating digital messages to and/or from the external trusted network device 202 via the network 216. The external trusted network device 202 may be a computing device, such as the computing device 100 shown in FIG. 1. The external trusted network device 202 may be a server, such as a web server, for providing a user interface to the computing devices 200-200n. The external trusted network device 202 may be in communication with one or more modules (e.g., integrity checking modules) executing locally on the computing devices 200-200n. The one or more modules (e.g., integrity checking modules) may be executed locally at the computing devices 200-200n and/or at the external trusted network device 202. The display of information may be provided via an application (e.g., a web browser) at the computing devices 200-200n.

The external trusted network device 202 may include a data store 204. Data store 204 may be used to store information transmitted to and/or information transmitted from external trusted network device 202. Data store 204 may be used to store information computed by external trusted network device 202. Data store 204 may be internal to and/or external from external trusted network 204.

Computing devices 200-200n may be configured to run software. For example, the computing device 200 may run software that may include system software, application software, and/or the like. System software may include software designed to operate and/or control the computer hardware, and/or to provide a platform for running application software. System software may include an operating system (e.g., Microsoft Windows®, Mac OS X®, Apple iOS, and/or Linux®) and/or system applications. A kernel may be a core part of an operating system on the computing devices 200-200n. The kernel may define an API for application programs and system software. The kernel may define an interface to device drivers. Device drivers such as a computer BIOS and device firmware may provide basic functionality to control the hardware connected to, or built into, the computer. The system software may include utility software. Utility software may be used to analyze, configure, optimize, and/or maintain the computer. Examples of utility software may include system profilers, disk storage utilities, disk compression utilities, screensavers, anti-virus applications, etc.

Application software may include computer programs designed to perform a group of functions, tasks, and/or activities for the benefit of an end-user, e.g., an end-user of computing device 200. Examples of application software may include word processors, spreadsheet software, media players, email applications, etc.

The operating system may be an open operating system, a closed operating system, and/or a combination of open and closed operating system. For closed operating systems, the operating system may be defined according to separate portions. Examples of closed operating systems may include Mac OS®, Apple iOS, as well as others. For example, closed operating systems may be defined as having an open portion and a closed portion.

Figure 3:
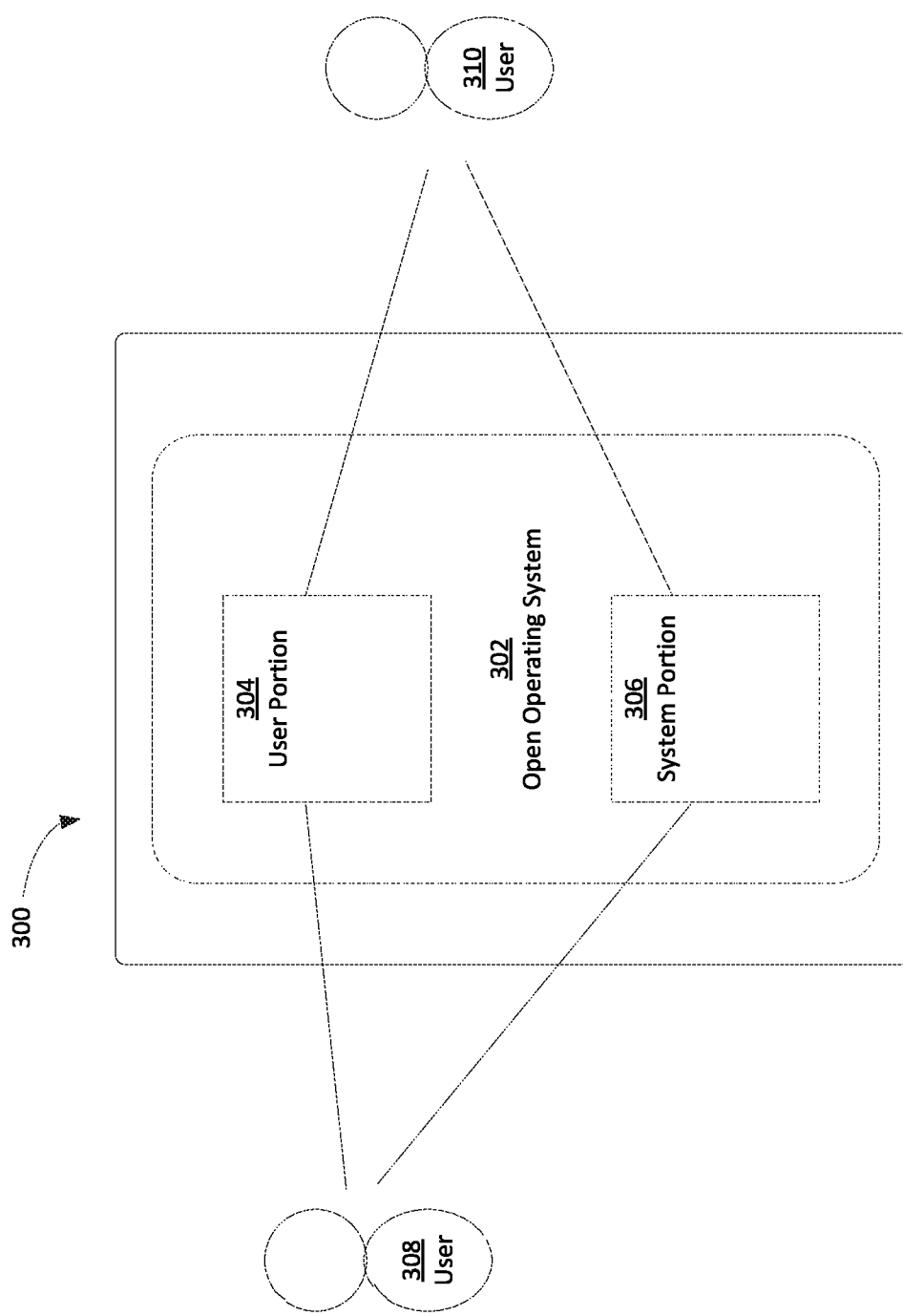
FIG. 3 illustrates a block diagram of an example computing device having an open operating system.

Computing devices may operate an open operating system and/or a closed operating system. FIG. 3 shows an example of a computing device 300 having an open operating system 302. As shown in FIG. 3, the operating system 302 may have a user portion 304 and/or a system portion 306. The user portion 304 and the system portion 306 may include different objects, such as files (e.g., applications) and/or attributes (e.g., memory, processes, file attributes or metadata, etc.), and/or other portions of the operating system 302. Different users, such as user 308 and administrator 310, may have different permissions that may enable access to different portions of the open operating system 302. Users, such as user 308 and/or administrator 310, of an open operating system 302 may have access to files and/or folders on the computing device 300. For example, users of an open operating system may have access to file structures, logical permissions (e.g., to application data), device information, diagnostics information, and/or the like. Device information may include information about the types of hardware devices in the computing device 310 (e.g., memory, drives, disk space, etc.). Diagnostic information may include system logs that identify performance characteristics of the computing device 310, such as CPU performance, battery life, and/or the like. Examples of an open operating system 302 may include Microsoft Windows®, Linux®, Android®, as well as others.

The user portion 304 may include user applications that may be accessed and executed by users, such as user 308 and/or administrator 310. The user 308 and/or administrator 310 may have permission to access, read, and/or write to the user portion 304. The user 308 and/or administrator 310 may have permission to write to the user portion 304, to download applications, to store user information within the user applications, and/or to read from the user portion 304, e.g., to execute user applications on the user portion 304.

The system portion 306 may include system objects (e.g., files, memory, processes, file attributes or metadata, etc.) that may be accessed by users, such as the user 308 and/or the administrator 310. The system files in the system portion 306 of the operating system 302 may include user profile information that identifies users and user password files (e.g., passwd file) for user access and permissions in the operating system 302. The user profile information may include the permissions available to different users of the operating system 302. The user profile information may indicate the users (e.g., the user 308 and/or the administrator 310) that have access to the system portion 306 and/or the user portion 304. The system files in the system portion 306 of the operating system 302 may include a privileged file system (e.g., the file system on which a root directory is located). The system files may include the files on which the operating system 302 and/or the user applications in the user portion 304 may be executed.

User permissions may be assigned by the operating system 302 for the different user types. In the open operating system 302, the user 308 may be able to access the user portion 304 and/or the system portion 306 of the open operating system 302. The user 308 may be restricted from reading and/or writing to identified files and/or folders in the system portion 306, but files and/or folders in the system portion 306 may be identified to the user 308. The administrator 310 may be able to access, read, and/or write to the identified files and/or folders in the system portion 306.

The open operating system 302 may allow the user 308 and/or the administrator 310 to access the file system and/or objects within the file system, including file structure, drives, partitions, folders, subfolders, files within folders or subfolders, memory, processes, etc. The user 308 and/or the administrator may submit queries (e.g., a query in Microsoft Windows® File Explorer for files, folders, etc.) to the user portion 304 and/or the system portion 306 to identify objects (e.g., files, folders, memory, processes, file attributes or metadata, etc.) in the file system of the open operating system 302. The administrator 310 may be able to access, read, and/or write to identified files and/or folders in the system portion 306 that may be returned in response to a query from the administrator 310. The user 308 may be restricted from accessing, reading, and/or writing to the identified files and/or folders in the system portion 306, but files and/or folders in the system portion 306 may be identified to the user 308.

The generic query may be a text search that may return objects (e.g., files, folders, memory, processes, file attributes or metadata, etc.) that match the text in the search, for example. The open operating system 302 may identify drives or partitions on the operating system 302 that may be accessed by the user 308 and/or the administrator 310. Drives or partitions that may be inaccessible by the user 308 may be identified to the administrator 310. The user 308 and/or the administrator 310 may select different folders within a drive or partition in the operating system 302 to be provided with information about the folders and/or files that are located within the folders.

FIG. 4A shows an example of the computing device 400 having a closed operating system 402. As shown in FIG. 4A, the closed operating system 402 may include a user portion 404 and a system portion 406. The user portion 404 and the system portion 406 may include objects, such as memory, processes, files (e.g., applications), folders, and/or other portions of the closed operating system 402.

Users, such as user 408, may have limited access to portions of the closed operating system 402. User permissions on the closed operating system 402 may be enforced by the closed operating system 402. In the closed operating system 402, the user 408 may have access to the user portion 404. The permissions of the user 408 in the closed operating system 402 may reside primarily at the application layer of the Open Systems Interconnection (OSI) model. For example, the user 408 may be permitted to install and/or uninstall applications, or a subset of applications, on the computing device 400.

The system portion 406 of the closed operating system 402 may be inaccessible to the user 408 (e.g., when the device 402 is uncompromised). The user 408 may be prevented from accessing the file structure of the closed operating system 402, communication parameters, adding additional users, gathering device logs, aggregating metadata, logical permissions (e.g., to application data), diagnostics information, and/or the like. The user 408 may be restricted from reading (e.g., via querying) and/or writing to identified files and/or folders in the system portion 406. Access to objects (e.g., files, folders, memory, processes, file attributes or metadata, etc.) on the system portion 406 of the closed operating system 402 may be restricted for the user 408. The user 408 may gain access to the system portion 406 by compromising (e.g., jailbreaking, rooting, or otherwise compromising) the computing device 400. Compromising the computing device 400 may be undesirable. The closed operating system 402 may disallow interrogation of the operating system 402 to identify files or folders. An example of a closed operating system 402 may include the APPLE® iOS, as well as others.

The user portion 404 may include user files (e.g., applications) that may be accessed and executed by users, such as user 408. The user 408 may have permission to access, read, and/or write to the user portion 404. The user 408 may have permission to write to the user portion 404 to download applications and/or read from the user portion 404 to execute user applications on the user portion 404.

The system portion 406 may include system objects (e.g., files, folders, memory, processes, file attributes or metadata, etc.) that may be inaccessible to the user 408 (e.g., when the computing device 400 is uncompromised). The system files in the system portion 406 of the operating system 402 may include user profile information that identifies users and user password files (e.g., passwd file) for user access and permissions in the closed operating system 402. The system files in the system portion 406 of the operating system 402 may include a privileged file system (e.g., a file system on which a root directory is located). The system files may include the files on which the operating system 402 and/or the user applications in the user portion 404 may be executed.

The user 408 may be unable to access folders, folder structures, files, and/or obtain the location of files or folders in the system portion 406 of the closed operating system 402. The user 408 may be restricted from access to drives, partitions, files, and/or folders located at the privileged (e.g., root) directory of the computing device 400 running the closed operating system 402. Different files (e.g., applications) that may be stored by the user 408 or on the user portion 406 of the operating system 402 may be given similar permissions to those of the user 408 by the closed operating system 402. For example, the files (e.g., applications) that are stored on the user portion 404 of the operating system may be unable to access folders, folder structures, and/or the location of files or folders in the system portion 406 of the closed operating system 402. The modules may limited to making function calls to the system portion 406 of the closed operating system 402 using an application programming interface (API).

There may be modules (e.g., files, such as applications, etc.) stored on the user portion 404 of the closed operating system 402 that may desire access to system objects (e.g., files, folders, memory, processes, file attributes or metadata, etc.), or information related to system objects, on the system portion 406 of the closed operating system 402 (e.g., which may be unavailable through the API offered with the closed operating system 402). For example, an integrity checking module (e.g., integrity checking application) may be stored by a user 408 on the user portion 404 of the closed operating system 402. To perform integrity checking of the computing device 400, the integrity checking module may request to check the integrity of system files stored at the system portion 406 of the closed operating system 402. The integrity checking module may be given the same permissions as the user 408 when installed on the user portion 404 of the closed operating system 402 and may be unable to access system objects, such as folders, folder structures, and/or the location of files or folders in the system portion 406 of the closed operating system 402 to retrieve system objects, or information related to system objects, on the system portion 406 of the closed operating system 402.

Figure 4B:
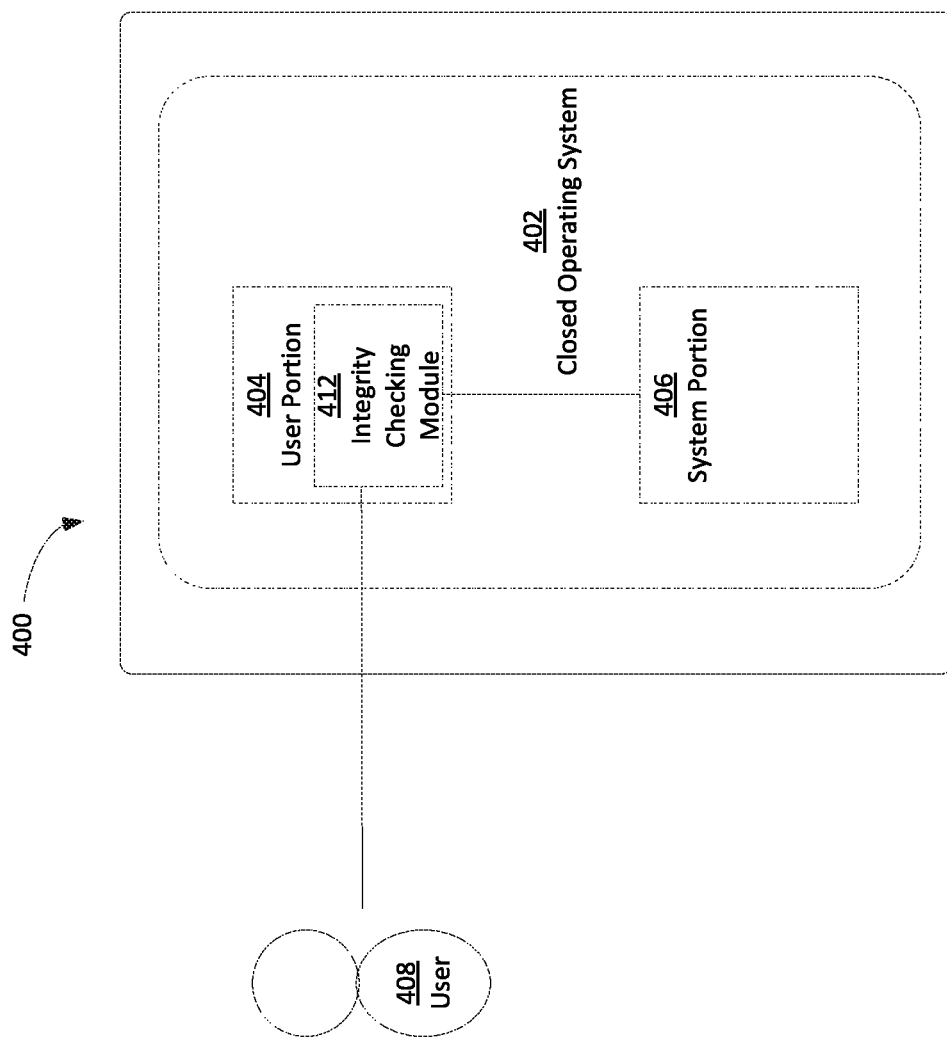

FIG. 4B shows an example of the computing device 400 having an integrity checking module 412 that may access information in the system portion 406 of the closed operating system 402. The integrity checking module 412 may be provided by the user 408 or a separate provisioning entity. A provisioning entity may provision the computing device 400 and/or the integrity checking module 412 to the user 408. The provisioning entity may be any entity that is providing integrity checking functionality to a device. For example, the provisioning entity may be an employer of the user 408, a third party software provider, and/or any other entity that provisions the computing device 400 and/or the integrity checking module 412 to the user 408. The provisioning entity may be a user of the computing device 400, such as user 408, for example.

The integrity checking module 412 may establish a set of rules for checking the integrity of the computing device 400. In response to execution of the set of the rules, the integrity checking module 412 may receive a set of device integrity parameters that may be values that may be used for checking the integrity of the computing device 400. The set of rules may be executed to perform queries on various objects (e.g., files, folders, memory, processes, file attributes or metadata, etc.) in the user portion 404 and/or the system portion 406 of the closed operating system 402 to return the device integrity parameters. The integrity checking module 412 may enable access to objects (e.g., files, folders, memory, processes, file attributes or metadata, etc.) in the system portion 406 of the closed operating system 402 by submitting queries to a known location of the objects.

The integrity checking module 412 may access known and/or unknown files, or file attributes or metadata related to known files and/or unknown files, in the closed operating system 402. The closed operating system 402 may enable the integrity checking module 412 to receive acknowledgement that a file is in a known location in the system portion 406 upon receipt of a specific query that includes the file name and the file directory (e.g., folder) in which the file is located. For example, the integrity checking module 412 may receive acknowledgement that the passwd file is located at the path location "/private/etc/passwd." The file name may be the complete file name (e.g., with or without the extension) and/or a relative file name (e.g., with or without the extension). The file directory may be the complete file path and/or the relative file path located in the system portion 406 of the closed operating system 402. The acknowledgement of the existence of the file may be received by the integrity checking module 412 as a device integrity parameter.

The integrity checking module 412 may query other objects, such as memory, processes, etc., of computing device 400. For example, the integrity checking module 412 may perform checks to determine identities, status, states, etc., of one or more processes running on the computing device 400. The acknowledgement of the existence and/or the identification of the process may be received by the integrity checking module 412 as a device integrity parameter. The integrity checking module 412 may perform status checks of the identified processes running on the computing device 400. For example, the integrity checking module 412 may perform checks on identified processes to determine whether the processes have statuses of ready, running, blocked, ready suspended, and/or blocked suspended. The integrity checking module 412 may perform checks of memory used by computing device 400. The integrity checking module 412 may check one or more of the memory locations used by computing device 400. The integrity checking module 412 may check one or more memory locations within computing device 400, and/or the integrity checking module 412 may check one or more memory locations external to computing device 400. The integrity checking module 412 may perform checks to determine whether each of the memory locations are allocated by a process, or whether the memory locations are free.

The integrity checking module 412 may receive other information related to a file as device integrity parameters. The other information may be received upon submission of the query that includes the file name and/or folder name of the folder in which the file is located, and/or additional parameters that indicate the other information being requested. For example, the integrity checking module 412 may obtain information relating to the passwd file stored in the system portion 406 in response to a query to the closed operating system 402 that includes the passwd file name and folder name in which the passwd file is being stored. The passwd file may include the accounts and/or passwords of users of the computing device 400. The information related to a file may include metadata (e.g., file creation date/time, file modification date/time, file access date/time, file owner, the group to which the file belongs, group owner name, an identifier of an object's group owner account, portable operating system interface (POSIX) permission listing, file version, file extension, file size, file type, related files associated with similar programs, a hidden status of an object's extension, etc.) or other parameters related to the file that is being requested.

The integrity checking module 412 may obtain information related to hardware as device integrity parameters. The hardware information may include information relating to hardware of the computing device 400, and/or hardware of devices communicating with the computing device 400. For example, the integrity checking module 412 may obtain information relating to physical memory of the computing device 400, a global positioning system (GPS) integrated within or communicating with the computing device 400, system uptime, hardware identifiers of components of the computing device 400, and/or the like. State information related to the hardware of computing device 400 may be obtained by the integrity checking module 412. For example, the integrity checking module 412 may obtain state information related to the hardware of computing device 400, including whether the computing device 400 has been rebooted, placed in airplane mode, etc.

The integrity checking module 412 may act according to a set of rules that may be stored on the computing device 400. The rules may enable the integrity checking module 412 to identify potential threats to the integrity of the computing device 400. The integrity checking module 412 may include rules that, when executed, check identified device integrity parameters (e.g., attributes) associated with the computing device 400 and/or files stored thereon. The integrity checking module 412 may generate values for each device integrity parameter. The integrity checking module 412 may look for the existence of changes to identified parameters or the absence of expected changes to the identified parameters in the computing device 400 to identify potential threats in the integrity of the computing device 400.

The integrity checking module 412 may include rules to identify a potential unauthorized access to a file as a potential threat to the integrity of the computing device 400. For example, integrity checking module 412 may identify a potential unauthorized access to a file by identifying whether a potentially unauthorized user has accessed the file. If the integrity checking module 412 identifies that users, other than users that are recognized by the closed operating system 402 (e.g., as being associated with the file), have accessed a file, the potential unauthorized access may be flagged. Integrity checking module 412 may identify files in the system portion 406 and/or the user portion 404 as files that may be inaccessible to other users. For example, the integrity checking module 412 may identify files associated with a first user, user account, or group of users as being inaccessible to a second user, user account, or group of users. If the files are accessed by another identified user, or an unidentified user, the access may be flagged. The integrity checking module 412 may also, or alternatively, identify files that may be inaccessible to any user, as the files may be system files that may be inaccessible to any user. The access of the files by any user may be flagged by the integrity checking module 412.

The integrity checking module 412 may include rules to identify a potential unauthorized creation, modification, and/or deletion of a file as a potential threat to the integrity of the computing device 400. For example, the integrity checking module 412 may perform a check to determine if a file (e.g., a passwd file) has been unexpectedly created, modified, and/or deleted. Files may be expected to be created, modified, and/or deleted at certain times of a day, week, month, year, etc. (e.g., updating a password, updating files according to regular reading/writing performed by user, etc.). The creation, modification, and/or deletion of any files outside of the expected times may be flagged by the integrity checking module 412. The creation of a user account and/or password (e.g., a passwd file) may be flagged by the integrity checking module 412.

The integrity checking module 412 may include rules to identify a potential unauthorized creation of an unknown file as a potential threat to the integrity of the computing device 400. For example, the integrity checking module 412 may perform a check to determine if an unknown file has been created. Certain files may be expected to be created. The integrity checking module 412 may maintain a list of files expected to be created. The list of files expected to be created may be known by the integrity checking module 412 at initialization of the computing device 400, and/or the list of files expected to be created may be updated by the integrity checking module 412 during checks. For example, the integrity checking module 412 may establish, at initialization of the computing device 400, a list of one or more files that are expected to be created. The integrity checking module 412 may update the list via, e.g., subsequent checks of files that are expected to be created. Files that are not expected to be created (e.g., files outside of the known and/or expected files) may be flagged by the integrity checking module 412.

The integrity checking module 412 may include rules that include a primary check and one or more secondary checks. The integrity checking module 412 may perform a check of primary device integrity parameters (e.g., attributes) associated with the computing device 400. The integrity checking module 412 may perform a check of primary objects (e.g., files, memory, portions of memory, processes, etc.). The integrity checking module 412 may perform a check of a potential unauthorized access to a primary file, and a potential unauthorized creation, modification, and/or a deletion of a primary file. Primary integrity parameters, objects, and files may include, for example, integrity parameters, objects, and files that may be targeted by an unauthorized user attempting to access computing device 400.

If the integrity checking module 412 identifies a potential compromise of one or more of the primary objects (e.g., files, memory, portions of memory, processes, etc.), the integrity checking module 412 may perform a secondary check on the potentially compromised objects. If the integrity checking module 412 determines that a primary device integrity parameter has been changed (e.g., unexpectedly changed), and/or the integrity checking module 412 determines that a primary device integrity parameter has not been changed (e.g., has unexpectedly not been changed), the integrity checking module 412 may perform a secondary check of the device integrity parameter. If the integrity checking module 412 determines that a primary file has been accessed (e.g., accessed unexpectedly), and/or the integrity checking module 412 determines that a primary file has been created, modified, and/or deleted (e.g., created, modified, and/or deleted unexpectedly), the integrity checking module 412 may perform a secondary check of the primary file.

The secondary check may be a more detailed check of the primary objects, or a check of related objects, to further investigate the potential compromise. The secondary check may include performing a check of different integrity device parameters and/or different files than were checked during the primary check. For example, if the integrity checking module 412 determines that a file identified as a primary file has been unexpectedly created, the integrity checking module 412 may perform a secondary check of one or more files identified as secondary files, to determine whether the computing device 400 was compromised. If the integrity checking module 412 determines that a primary file does not exist, the integrity checking module 412 may attempt to identify secondary files that may exist that may be related to the primary file.

The existence of files in known locations may be identified according to the rules of the integrity checking module 412 as a potential threat to the integrity of the computing device 400. For example, the existence of software (e.g., malware, etc.) in a known location (e.g., folder or directory) may be identified in the device integrity parameters and flagged by the integrity checking module 412. Examples of malware may include, e.g., computer viruses, worms, trojan horses, spyware, adware, scareware, as well as other software programs designed for malicious purposes. Malware may take the form of executable code, scripts, active content, and/or other software. Malware may be disguised as, or embedded in, non-malicious files. Malware may be used to gather information (e.g., sensitive information), and/or gain access to private computer systems, without detection. Malware may be embedded in programs after being supplied by a legitimate source. An example of such software may be referred to as spyware. For example, malware may be unintentionally downloaded to computing device 400 when computing device 400 downloads another file from a website. The integrity checking module 412 may flag the existence of the files in the known locations as a potential threat to the integrity of the computing device 400.

The integrity checking module 412 may include rules to identify potentially unauthorized permissions (e.g., access, read, write, etc.) that have been given to a user and identified in the device integrity parameters as a potential threat to the integrity of the computing device 400. For example, an authorized user may attempt to compromise (e.g., jailbreak, root, etc.) and/or alter the closed operating system 402 to enable permissions to restricted system information. Compromising (e.g., jailbreaking, rooting, etc.) and/or altering the closed operating system 402 may include a process of removing hardware and/or software restrictions imposed by the closed operating system 402. Compromising (e.g., jailbreaking, rooting, etc.) and/or altering the closed operating system 402 may allow the user 408 to access previously inaccessible information on the system portion 406 of the closed operating system 406. For example, compromising and/or altering the closed operating system 402 may permit privileged (e.g., root) access to the closed operating system 402, which may allow the user 408 of the computing device 400 to download applications that would otherwise be unpermitted to be downloaded onto the closed operating system 402. The integrity checking module 412 may flag the potentially unauthorized permissions (e.g., access, read, write, etc.) that have been given to the user 408 as a potential threat to the integrity of the computing device 400.

The integrity checking module 412 may include rules to identify potentially unauthorized uses of the computing device 400 identified in the device integrity parameters as a potential threat to the integrity of the computing device 400. An entity (e.g., the provisioning entity) may define certain uses of the computing device 400 by the user 408 that are accessible to the integrity checking module 412. For example, the provisioner of the computing device 400 may provide the computing device 400 to the user 408 so that the user 408 may conduct business calls, browse web pages, check email, and/or perform other authorized uses at the computing device 400. The provisioner of the computing device 400 may define compromises (e.g., jailbreaking, rooting, etc.) and/or alterations (e.g., impermissible reading, writing, accessing of objects) of the computing device 400 as an unauthorized use of the computing device 400, such that compromising (e.g., jailbreaking, rooting, etc.) and/or altering the computing device 400 may be flagged as a potential threat to the integrity of the computing device 400.

The integrity checking module 412 may include rules to identify hardware characteristics that may be modified. For example, the integrity checking module 412 may determine that during operation of the computing device 400, changes may be made to disk space, network communication ports, processing (e.g., central processing unit (CPU)) power, available memory, and/or other hardware components. The integrity checking module 412 may define high and/or low thresholds for the hardware characteristics. The thresholds may be predefined based on the type of computing device 400. The integrity checking module 412 may monitor the hardware characteristics and flag a potential threat to the integrity of the computing device 400 when a hardware characteristic is outside of the defined threshold. Any addition or changes to the network communication ports may be flagged as a potential threat to the integrity.

The integrity checking module 412 may include rules to identify changes to hardware and/or software versions as a potential threat to the integrity of the computing device 400. For example, the integrity checking module 412 may monitor the version of the operating system, kernel, build, firmware, and/or other software or hardware on the computing device. When a change to the versions is made, a reversion is made, or an unexpected change to the version is made, the integrity checking module 412 may flag a potential threat to the integrity of the computing device 400.

The integrity checking module 412 may include rules to interrogate the integrity checking module 412 itself to identify potential threats to the integrity of the computing device 400. The integrity checking module 412 may include rules to identify potential changes to versions of the integrity checking module 412, changes to the rules and/or parameters stored on the integrity checking module 412, changes to the owner/author of the integrity checking module 412, and/or other changes to the integrity checking module 412 and flag a potential threat to the integrity of the computing device 400. The integrity checking module 412 may identify the absence of an expected integrity check (e.g., periodic check), or integrity reports or integrity values resulting from the integrity check, as a potential threat to the integrity of the computing device.

The integrity checking module 412 may check one or more device integrity parameters to indicate an integrity level of the computing device 400. When multiple parameters are checked, the parameters may be weighted and/or combined to determine different levels of integrity for the computing device 400. The weight given to different parameters may be totaled and compared to an overall integrity threshold to identify and/or flag the integrity of the computing device 400. For example, the computing device 400 running a version of an operating system that is running an old version of software may or may not fail an integrity check. However, the computing device 400 running an operation system that is running an old version of software, and includes one or more other parameters that increase the total threat to the integrity of the computing device, may fail the integrity check. The weighting of integrity checks may provide a range of integrity checking and may trigger integrity failures on a combination of potential threats to the integrity. The integrity checking module 412 may generate an integrity report that includes the result of the integrity check for each of the parameters, a combination of the parameters (e.g., weighted and/or unweighted parameters), and/or the integrity level of the computing device 400.

The integrity checking module 412 may include heuristics that enable the integrity checking module 412 to learn from prior integrity checks. For example, the integrity checking module 412 may modify the rules and/or device integrity parameters (e.g., build on the device integrity parameters) based on the results of prior device integrity checks. The discovery of unknown files may be added to the files to be checked in subsequent integrity checks. If objects go unchanged over a period of time, the threat of the objects may decrease. If objects change over the period of time, the threat of the objects may increase.

The rules of the integrity checking module 412 may be executed to perform baseline checks to identify the integrity of the computing device 400. The baseline checks may be performed to check the integrity parameters identified in the rules stored on the integrity checking module 412 and output the integrity report as a baseline integrity report. An initial baseline check may be performed by generating digital signatures and/or hashes (e.g., cryptographic hashes) on the parameters of the computing device 400 that are identified in the rules stored in the integrity checking module 412. The digital signatures and/or hashes may be generated from a function (e.g., hashing function) that creates a unique signature or hash based on the underlying data (e.g., integrity parameters, such as file attributes and/or system attributes) being input into the function. The digital signatures and/or hashes may be generated from a function (e.g., hashing function) that creates a unique signature or hash based on a combination of the underlying data (e.g., a combination of integrity parameters, such as a combination of file attributes and/or system attributes) being input into the function.

One or more subsequent baseline checks may be performed by the integrity checking module 412, e.g., to output a subsequent integrity report. The digital signatures and/or hashes of the subsequent integrity report may be compared against the digital signatures and/or hashes in prior integrity reports, e.g., to determine whether changes have been made to the underlying data (e.g., integrity parameters). The digital signatures and/or hashes of the subsequent integrity report may be compared against the digital signatures and/or hashes in baseline integrity reports to determine whether changes have been made to the underlying data (e.g., integrity parameters). The digital signatures and/or hashes will be the same if the underlying data (e.g., integrity parameters) is the same, and the digital signatures and/or hashes will be different if the underlying data (e.g., integrity parameters) is different. Subsequent integrity checks may be performed by the integrity checking module 412 to periodically ensure that parameters are current with a latest version of the closed operating system 402 and/or applications stored therein. For example, the integrity checks may be performed upon receipt of, or within a predetermined period of time from, notification of an upgrade.

The integrity checking module 412 may be integrated within the computing device 400 (e.g., the integrity checking module 412 may be an application running on the computing device 400). The integrity checking module 412 may be external to the computing device 400 (e.g., the integrity checking module 412 may be running on a computing device external to the computing device 400 and communicating with the computing device 400 via wired and/or wireless channels). The integrity checking module 412 may run across multiple devices, e.g., the integrity module may run remotely between the computing device 400 and another device (e.g., a server).

Figure 5:
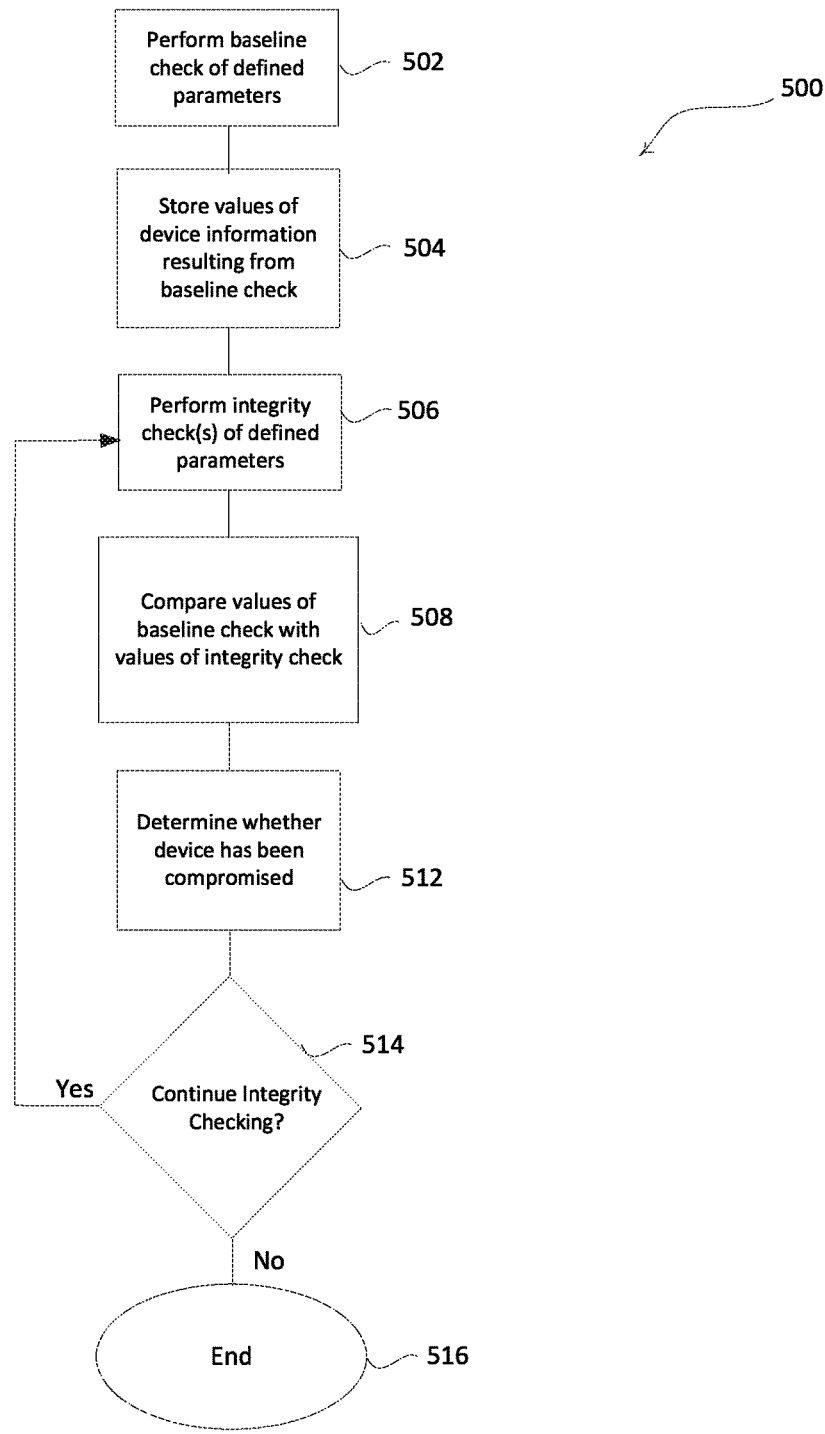
FIG. 5 is a flow diagram of an example method that may be implemented to check integrity at a computing device.

FIG. 5 shows an example method 500 for generating an integrity report at a computing device, such as the computing device 400 shown in FIGS. 4A and 4B. The method 500, or portions thereof, may be performed at a computing device 400 or may be distributed across multiple computing devices (e.g., a server and computing device 400). For example, the method 500, or portions thereof, may be performed by an integrity checking module, such as the integrity checking module 412 shown in FIG. 4.

At 502, a baseline check may be performed. The baseline check may obtain device integrity parameters related to objects (e.g., files, folders, memory, processes, file attributes or metadata, etc.) on a closed operating system. The baseline check may be performed on parameters identified in a set of rules stored at the integrity checking module 412. The baseline check performed at 502 may output a baseline integrity report that comprises values of device integrity parameters defined by the baseline check. The baseline check performed at 502 may be an initial baseline check that may be performed by the integrity checking module 412 at the computing device 400. The initial baseline check may be performed at 502 after installation of the integrity checking module 412, prior to provisioning of the computing device 400 and/or the integrity checking module 412, when the computing device 400 is turned on, and/or at another identified time. By performing the baseline check prior to provisioning of the computing device 400, and/or before the computing device 400 is used by the user, the provisioner of the computing device 400 may ensure that the baseline integrity check includes attribute information relating to authorized use and/or access of the computing device 400.

For example, a baseline check may be performed on the computing device when the computing device is purchased, upon a lapse of a certain time period (e.g., performing the baseline check every 2 months), after an addition and/or modification of the hardware and/or software (e.g., after memory is added to the computing device, the operating system is updated, etc.), after an irregular and/or unauthorized use of the computing device is detected (e.g., a possible compromise of the computing device is detected), upon a request by the user (e.g., administrator) and/or provisioner of the computing device, and/or any other reason that a provisioner and/or user of the computing device may desire to perform a baseline check of the computing device. The initial baseline check may be performed at 502 when the computing device is first purchased, upon a lapse of a certain time period (e.g., performing the baseline check every 2 months), after an addition and/or modification of the hardware and/or software (e.g., after memory is added to the computing device, the operating system is updated, etc.), after an irregular and/or unauthorized use of the computing device is detected (e.g., a possible compromise of the computing device is detected), upon a request by the user and/or provisioner of the computing device, and/or any other triggering of a baseline check of the computing device 400.

The baseline check performed at 502 may be aperiodic or periodic. An aperiodic baseline check may be performed upon a triggering event, such as a user selection at the computing device 400 or a remote device, for example. A periodic baseline check may be performed after a predetermined period of time. The integrity checks may be performed, e.g., every 10 seconds, 10 minutes, 1 hour, 1 day, 1 week, etc. The period for performing the integrity checks may be configurable. The configuration of the period may be based on a predefined policy. For example, the period may be adjusted based on the risk of unauthorized access posed to the computing device 400. A risk of unauthorized access to the device may include a user of the computing device traveling internationally, a user having a history of risky activity (e.g., compromising a device, losing a device, etc.), etc. A computing device assigned a higher risk of unauthorized access may be assigned a higher risk profile than another computing device. Accordingly, a computing device 400 assigned a higher risk profile (e.g., a device being transported abroad) may perform subsequent checks at shorter periods (e.g., subsequent checks every 5 minutes) than a device that has a lower risk profile (e.g., subsequent checks every 10 minutes).

The values derived from the device integrity parameters in the baseline check may be stored at 504. The values may be stored in the integrity report. The values may be stored on the computing device 400, and/or the values may be stored on a device other than the computing device 400 (e.g., an external server, hard drive, etc.). The values may be stored on the user portion of the computing device 400, such as on the integrity checking module 412.

If the values of the device integrity parameters generated by the baseline integrity check are transmitted to an external device, the values may be transmitted via a wireless connection and/or a wired connection. Transmissions of the values of the device integrity parameters to the external device may be performed via a trusted channel (e.g., a trusted security channel, such as an encrypted transport layer security (TLS), a secure sockets layer (SSL) channel, and/or the like). The values of the device integrity parameters may be encrypted, e.g., to prevent an unauthorized user from modifying the transmitted and/or stored values.

The computing device 400 may perform a subsequent integrity check at 506. The integrity check may be a check of the device integrity parameters obtained during the baseline check, or a portion thereof. For example, the integrity check performed at 506 may check the same parameters checked at 502. In another example, the integrity check performed at 506 may check a subset of the parameters checked at 502 (e.g., for more efficient processing, conservation of power, etc.). The integrity check performed at 506 may be periodic or aperiodic. The type and/or amount of information checked at the integrity check at 506 may be based on the risk profile assigned to the computing device 400. For example, the parameters and/or the number of parameters checked at 506 may be configured according to the risk profile assigned to the computing device 400, such that more parameters or different parameters may be checked for a device with a higher risk profile.

The integrity check may be provided to compare integrity values of the device integrity parameters at a later time with baseline integrity values obtained for the integrity parameters during the baseline check. The values of the baseline check performed at 502 may be compared with the values of the integrity check at 508. For example, one or more values of the device integrity parameters in the integrity report generated from the baseline check performed at 502 may be compared with the values of the device integrity parameters in the integrity report generated from the integrity check performed at 506.

At 512, it may be determined whether the integrity of the computing device 400 has been compromised. For example, information found during the integrity checks that is inconsistent with information found during the baseline checks may indicate that the computing device 400 has been compromised (e.g., the computing device has been accessed by an unauthorized user and/or the computing device 400 has been used in an unauthorized manner). Thresholds may be provided for determining whether a computing device 400 has been compromised. For example, integrity checks may determine that information has changed by a predetermined amount from the baseline check. If the changed information has changed within a threshold, however, the integrity checking module 412 may determine that the integrity of the computing device 400 is uncompromised.

The integrity of the computing device 400 may be determined at 512 based on a weight that is given to the value of different parameters. The total weighted value of the parameters may be compared against a predefined threshold to determine the integrity of the computing device 400. Different parameters may be weighted more heavily than others. For example, parameters indicating the presence of malware may be weighted more heavily than a parameter indicating that the computing device 400 is not running an approved operating system version. Some parameters may be weighted above the predefined threshold itself, such that the value of the parameter may trigger an automatic compromise in the integrity of the computing device. For example, changes to the ownership of different files, the addition of accounts to the computing device 400, a user compromise (e.g., jailbreaking) of the device, changes to the integrity checking module 412, and/or other changes or additions of files may be given a value that is automatically weighted above the predefined threshold. Other parameters (e.g., addition of an unknown file) may be given a value that may not automatically trigger a compromise, but when combined with the values of other parameters may rise above the predefined threshold and may trigger a compromise.

Values determined during integrity checks may match values of baseline checks according to a policy (e.g., a risk profile assigned to the computing device). For example, the version of the operating system may be determined during the integrity checks to ensure that the operating system version determined during the integrity checks matches the version of the operating system determined during the baseline checks. If the version of the operation system identified during the integrity checks does not match the version of the operating system identified during the baseline check, or come within a predefined number of versions, the computing device may be considered compromised.

At 514, the integrity checking module 412 may determine whether to continue integrity checking. If the integrity checking module 412 decides to stop integrity checking, the method 500 may end at 516. If, at 514, the integrity checking module 412 decides to continue integrity checking, the method 500 may return to 506 to perform another integrity check of the computing device 400. The integrity checking module 412 may decide to continue integrity checking at 514 after a predetermined period of time for periodic integrity checks and/or triggering of the aperiodic integrity checks (e.g., user selection of a button).

The values of device integrity parameters derived from the integrity check performed at 506 may be stored for comparison against the values of the device integrity parameters derived from subsequent integrity checks at 506 or the integrity checks performed at 506 may be compared against the values derived from the baseline check performed at 502. The values from the integrity checks may be stored on the computing device 400, and/or on a device other than the computing device (e.g., an external server, hard drive, etc.). The values may be stored on the user portion of the computing device 400 (e.g., memory of the computing device 400). In examples wherein the values are stored externally to the computing device 400, the values may be transmitted to an external device (e.g., an external computing device, an external hard drive, etc.). If an attempt to transmit the values fails, the computing device 400 may attempt to retransmit the values (e.g., the computing device 400 may attempt to retransmit the values at a designated time). The computing device 400 may transmit and/or retransmit the values to the external device via a wireless connection and/or a wired connection.

Transmissions of the values may be performed via a trusted channel (e.g., a trusted security channel). For example, transmission of the values via a wireless connection may be via trusted (e.g., secure) connections. Examples of such trusted connections may include an encrypted transport layer security (TLS), a secure sockets layer (SSL) channel, and/or the like. The transmitted values of the subsequent checks, and/or the stored values of the subsequent checks, may be encrypted, e.g., to prevent an unauthorized user from modifying the transmitted and/or stored values.

The device integrity report may reside on the computing device 400, for example. The device integrity report may include the values of the device integrity parameters that result from one or more device integrity checks. The device integrity report may be stored on the user portion of the memory. The device integrity report may be stored externally (e.g., external computing devices, such as external trusted network 202, external hard drive, etc.) to the computing device 400. The device integrity report may be transmitted to the external device via, for example, a wireless connection and/or a wired connection. Transmissions of the device integrity report may be performed via a trusted channel. For example, transmission of the device integrity report via a wireless connection may be via trusted (e.g., secure) connections, such as an encrypted transport layer security (TLS), a secure sockets layer (SSL) channel, and/or the like. If an attempt to transmit the device integrity report fails, the computing device 400 may attempt to retransmit the device integrity report (e.g., the computing device 400 may attempt to retransmit the device integrity report at a designated time). The transmitted device integrity report may be encrypted in some examples, e.g., to prevent an unauthorized user from modifying the transmitted and/or stored device integrity report.

Figure 6:
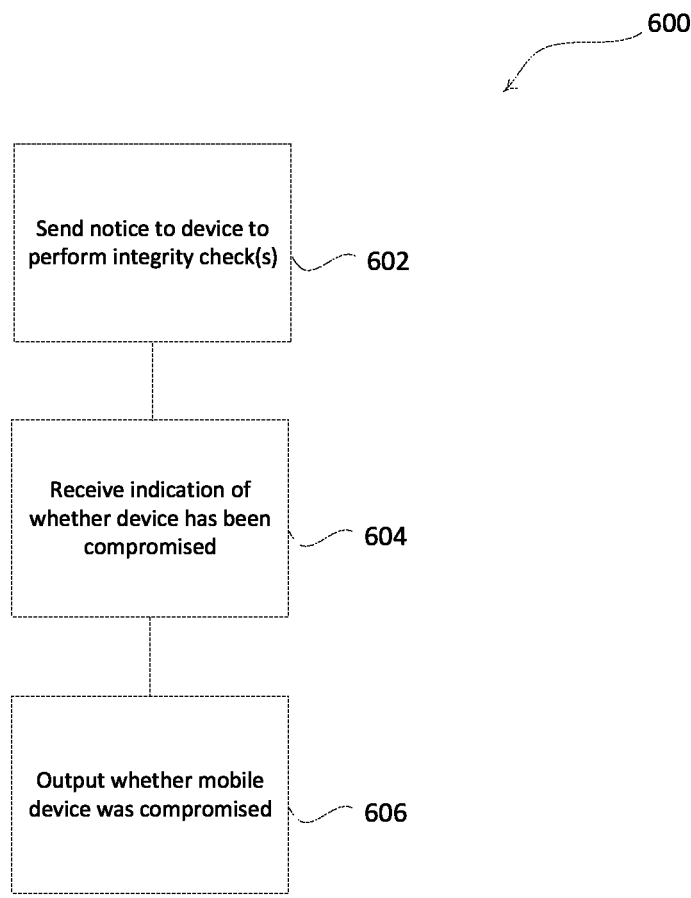
FIG. 6 is a flow diagram of an example method illustrating that may be implemented by an external trusted network.

FIG. 6 is a flow diagram of an example method 600 illustrating steps an external trusted network device, such as external trusted network device 202, may perform to determine whether the integrity computing device 200, 400 has been compromised. At 602, the external trusted network device 202 may send notice to a computing device 200, 400 to perform integrity checks. The external trusted network device 202 may send the notice to computing device 200, 400 aperiodically, and/or, the external trusted network device 202 may send the notice to computing device 200, 400 periodically. For example, the external trusted network device 202 may send the notice to computing device 200, 400 when desired by an administrator of the external trusted network device 202, according to a policy (e.g., the computing device 200, 400 is traveling internationally), the computing device 200, 400 is powered on but is no longer communicating with the external trusted network device 202, and/or another policy.

The external trusted network device 202 may receive, at 604, an indication of whether the integrity of the computing device 200, 400 has been compromised. The indication may be based on the integrity checks, as described herein. The indication of whether the integrity of the computing device 200, 400 has been compromised may include a binary indication (e.g., device is compromised or device is uncompromised), and/or the indication of whether the integrity of the computing device 200, 400 has been compromised may include a detailed indication (e.g., an indication that the computing device 200, 400 is compromised, why the device is considered compromised, how long the computing device 200, 400 is considered to have been compromised, and so forth). The indication of whether the integrity of the computing device 200, 400 has been compromised may include the integrity report generated at the computing device.

At 606, the external trusted network device 202 may output whether the computing device 200, 400 is compromised. For example, the external trusted network device 202 may send information to the computing device 200, 400 or another display corresponding to the indication received at 604. For example, if the external trusted network device 202 receives an indication that the computing device 200, 400 has been compromised, the external trusted network device 202 may output information identifying that the device is compromised and/or details of how the computing device 200, 400 can correct the perceived compromise. For example, the external trusted network device 202 may output information regarding software patches (e.g., patches used to correct the compromise), instructions for correcting the compromise, and/or instructions to power off the computing device 200, 400.

FIGS. 7A-7D depict example configurations of a user interface 700 that may be generated at a computing device for notifying a user of the integrity of a computing device. The user interface 700 may be a graphical user interface. The user interface 700 may provide information to the user of the device, the provisioner of the device, etc., relating to the integrity of the computing device. For example, the user interface may provide information to the user, provisioner, etc. that may indicate whether the computing device has been compromised. The user interface 700 may provide information to the user, provisioner, etc. describing the computing device and/or whether the device has been compromised. The computing device may provide information to the user, provisioner, etc. via the user interface 700 when the computing device has been compromised (e.g., when the computing device may be considered unhealthy). The user interface 700 may be generated based on the device integrity report, or values of device integrity parameters therein.

Figure 7A:
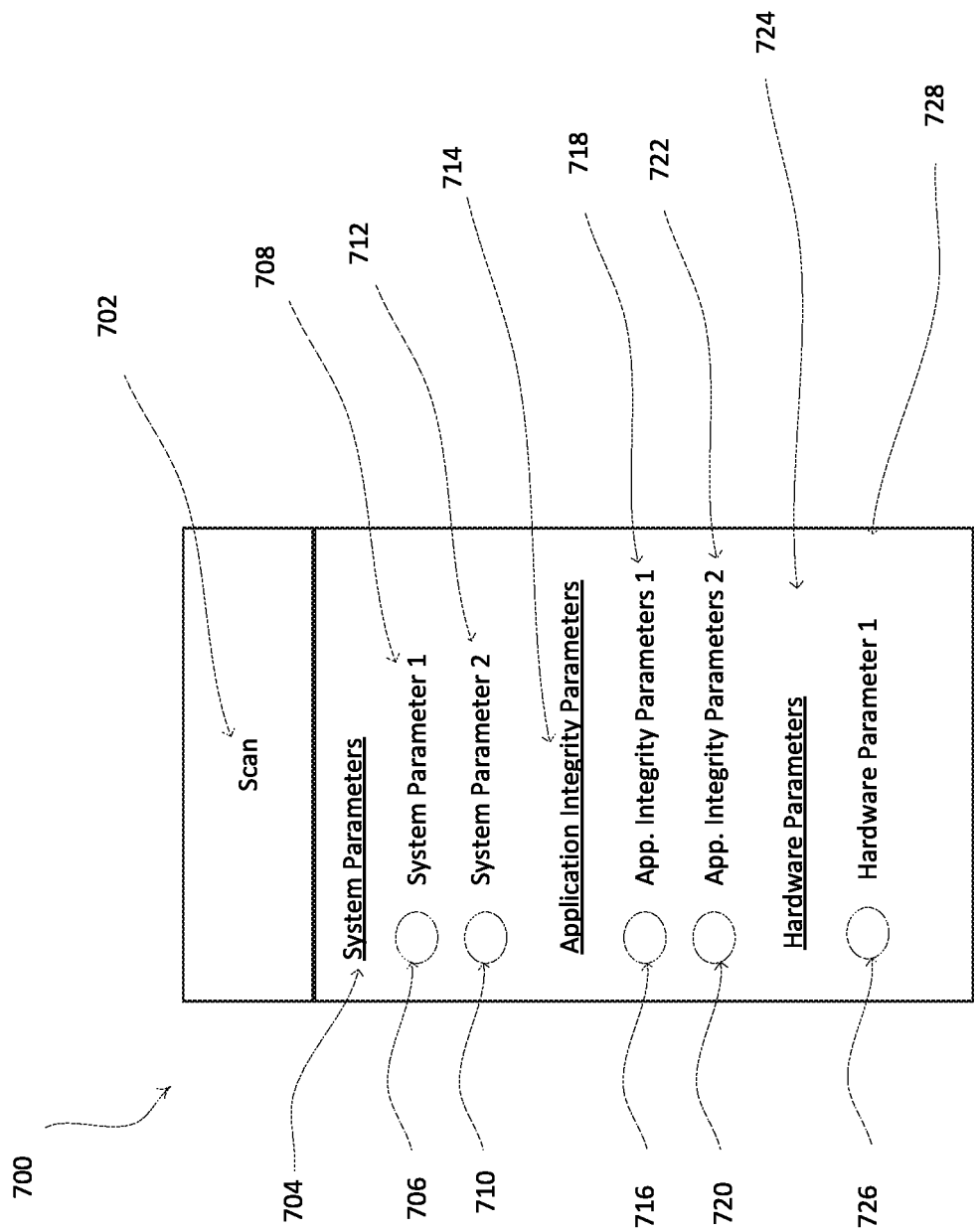
Figure 7B:
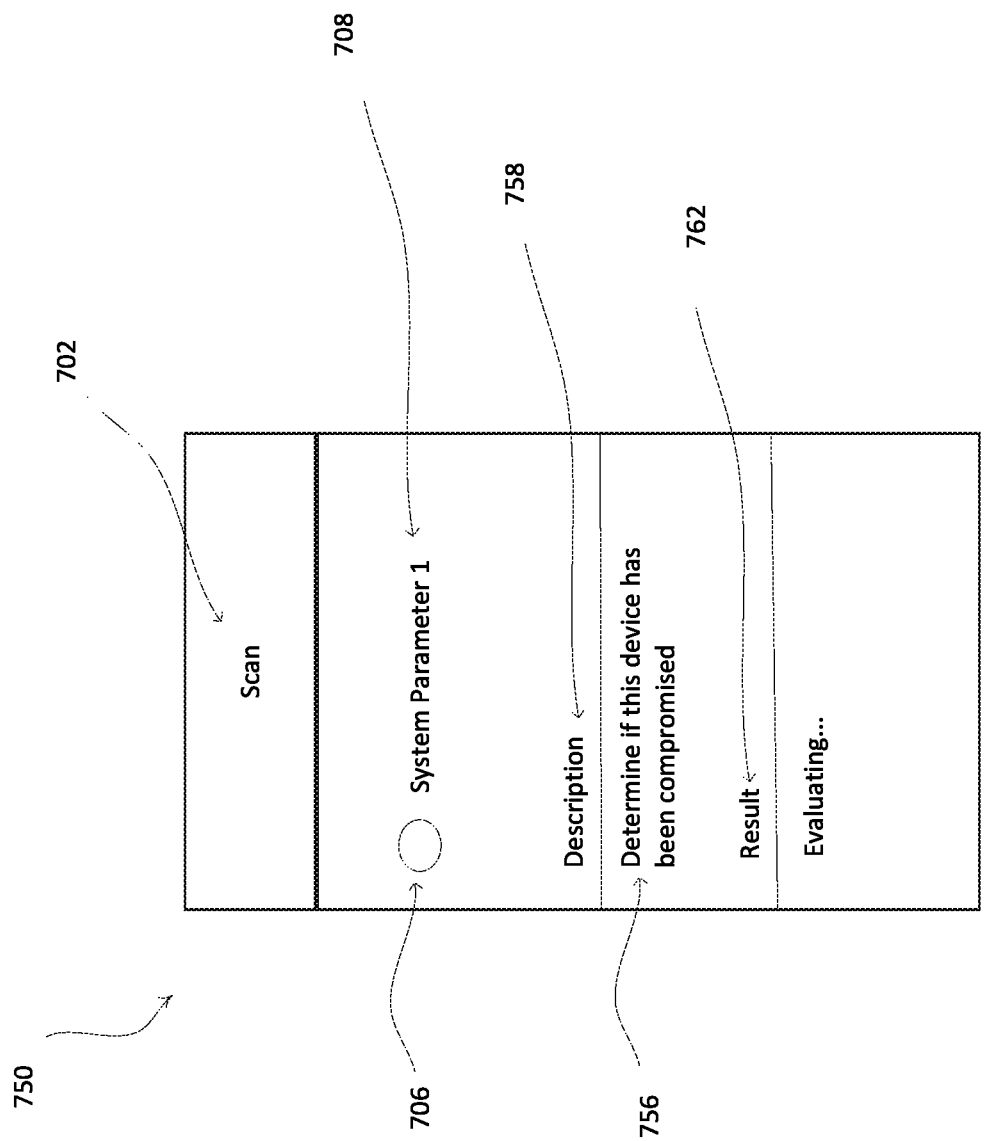

FIG. 7A shows an example configuration of the user interface 700 that includes parameters to be checked or parameters that have been checked by the computing device. The parameters may be predefined (e.g., by the provisioning entity) and/or may be randomly selected. As shown in the example configuration of the interface 700 shown of FIG. 7A, the interface 700 may provide a list of the parameters to be checked for integrity. One or more of the parameters may be checked for integrity upon selection of the parameter and/or the scan button 702.

The list of parameters to be checked may be categorized. In the configuration of interface 700 shown in FIG. 7A, the parameters to be checked for integrity may be included in different categories (e.g., system parameters 704, integrity parameters 718, and application parameters 724), wherein each category may include parameters relating to that category. The categories, and information, provided on FIG. 7A is for illustrative purposes. Other interfaces may have fewer, more, and/or different categories and corresponding parameters.

System parameters 704 may include system parameters 708, 712 that may indicate the integrity of different parameters related to the system portion of the operating system. For example, the system parameter 708 may indicate whether the computing device has been compromised (e.g., jailbroken) and/or system parameter 712 may indicate whether the operating system (e.g., version) of the computing device is within the defined parameters. The system parameters 704 may include other parameters related to the system portion of the operating system.

Application integrity parameters 714, as shown in FIG. 7A, may include application integrity parameters 718, 722 that may indicate the integrity of different parameters related to the integrity of application files (system application files and/or user application files) on the operating system (e.g., on the system portion and/or the user portion). For example, the application integrity parameter 718 may relate to the integrity of a first application (e.g., based on the signature of the application) and/or application integrity parameter may relate to the integrity of a second application (e.g., based on the signature of the application). The value of the application integrity parameters 714 may be determined based on the existence of the application, files used for execution of the application, metadata related to the application, and/or other values. The application integrity parameters 714 may include other parameters related to the integrity of applications on a portion of the operating system.

The application integrity parameters 714 may indicate information regarding segregated applications. Applications may be segregated (e.g., sandboxed) from one another so that untrusted and/or unverified party (e.g., user, website, etc.) applications may be downloaded with limited exposure to other applications. Scanning the integrity parameter related to segregated applications may indicate to the user, provisioner, etc. of the device whether the segregated applications are compromised and/or harmful to the computing device.

Scanning the application integrity parameters 714 may indicate whether the integrity of applications may be compromised, e.g., based on an inconsistent signature of one or more parameters of the applications. The user interface 700 may include application hash parameters that may be scanned to indicate whether the integrity of applications may be compromised based on an inconsistent hash of one or more parameters of the applications.

Another category provided on the interface 700 may include hardware parameters 724, which may list different parameters for different types of hardware on the computing device. Hardware parameters 724 may include hardware parameter 728. The hardware parameters 724 may identify the integrity of different types of hardware installed in the computing device based on information associated with the hardware (e.g., memory, processes, versions, etc.). Though the system parameters 704, application integrity parameters 714, and/or the hardware parameters 724 are provided as an example of the groups of parameters that may be provided to the user, other groups of parameters may be provided.

As shown on FIG. 7A, the computing device may provide to a user, provisioner, etc. of the device the parameters that are being scanned for integrity. When the information is being scanned, an indication that results from the scan may be provided to the user. For example, the interface 700 may provide scan indicators 706, 710, 716, 720, 726 to the user that each correspond to parameters that are being, or have been, scanned. The computing device may provide a blinking effect on the indicators 706, 710, 716, 720, 726 when a scan is being performed on the corresponding parameters.

The computing device may provide individual indicators of specific parameters that are being scanned. The indicators 706, 710, 716, 720, 726 may indicate whether corresponding parameters have been scanned and/or a result of the scan.

The indicators 706, 710, 716, 720, 726 may provide a visual indication that the corresponding parameters are being scanned by providing a particular color, visual effect, etc., to indicate the result of the scan. For example, indicator 706 may indicate (e.g., with the color green) when the system parameter 708 is not being scanned and/or when the scan determines the computing device is determined not to be compromised as a result of the parameter 708. Indicator 706 may change to another color (e.g., yellow) to indicate the system parameter 708 is being scanned and/or the computing device may possibly be compromised (e.g., due to the value of the system parameter 708). Indicator 706 may flicker, change shape, change color, and/or perform any other type of effect (e.g., visual and/or audio effect) to indicate that the corresponding system parameter 708 is being scanned. Indicator 706 may indicate (e.g., with the color red) when the system parameter 708 has been scanned and/or the computing device may be determined to be compromised, e.g., due to the value of the system parameter 708. Though the system parameter 708 and the corresponding indicator 706 are provided as an example of the types of indications that may be provided to the user, similar indications may be provided via other indicators for corresponding parameters. The interface may provide such scanning indications during the baseline integrity checks and/or other integrity checks on the computing device.

The interface may provide an indication to the user, provisioner, etc. of how and/or why the computing device is being scanned. As shown on FIG. 7B, the interface 750 may provide a description 758 of the parameters that are being scanned on the computing device and/or a reason 756 why the parameters are being scanned. The indication may be visual, audio, or a combination of both. Providing such information to the user may indicate how and/or why the computing device is being scanned (e.g., to provide an indication to a user that the device is not to be used while scanning). Further, the indication of scanning may provide a deterrent to users of the computing device so that the users do not perform an unwanted action to the computing device. For example, if a user is aware (e.g. via the user interface 700, 750) that the computing device will be scanning the system parameter 708 (e.g., jailbreaking) of the device, the user may be less likely to perform an action affecting the system parameter 708 of the computing device. This may, in turn, provide additional security of the device.

The interface may provide a result 762 of the scan. The result 762 may be provided to the user, provisioner, etc. of the device. The result 762 of the scan may include an indication that the integrity of the device is currently being evaluated, a finding of the computing device to be compromised, a finding of the computing device to not be comprised, a finding of the device to possibly be compromised, and/or an inconclusive result.

Figure 7C:
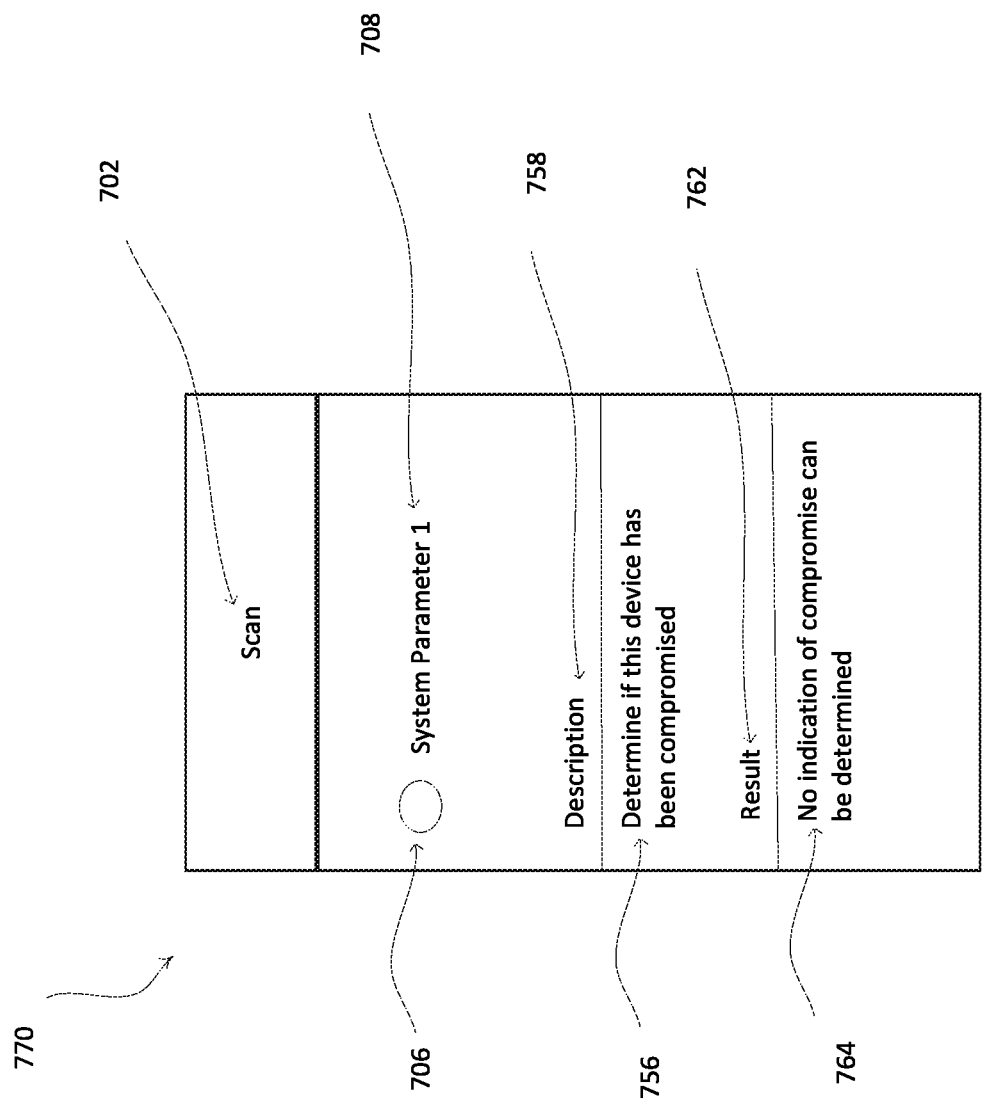

FIG. 7C shows an example interface 770 wherein the scan has determined that the computing device has not been compromised. As shown on FIG. 7C, the interface 770 may provide an indication 764 that the scan did not detect a compromise to the integrity of the computing device for the identified parameter 708. Indicator 764 may be displayed via text and/or a predefined color if the scan of the computing device determines that the integrity of the computing device has not been compromised. Indictor 764, for example, may be shown as the color green if the scan of the computing device determines that the integrity of the computing device has not been compromised and/or a color of red if the scan of the integrity of the computing device determines that the computing device has been compromised. The indictor 764 on the interface 770 may provide a quick indication of whether the integrity of the computing device has been compromised.

Text of the scanning result 762 may be provided to the user (e.g., on the display, via email, etc.). The text of the interface 770 may allow additional information to be provided to the user, provisioner, etc. of the computing device. As an example, the text may indicate that the current scan did not detect a compromise, but the computing device may want to update the integrity checking software, operating system software, and/or other software or parameters.

As shown on FIG. 7D, the example interface 790 may provide an indication 766 that the scan resulted in a determination that the computing device was compromised. As shown on FIG. 7D, the interface 790 may provide the result 762 in text (e.g., may provide text that the scan did detect a compromise of one or more parameters of the computing device). In addition, or, in the alternative, the interface 790 may provide an indication of the device being compromised via other indicators (e.g., visual indicators, audio indicators, etc.). For example, indicator 766, shown on FIG. 7D, may become a predefined color if the scan of the computing device determines that the integrity of the computing device has not been compromised. Indictor 766 may be shown as the color red if the scan of the computing device determines that the integrity of the computing device has been compromised, or the system parameter does not meet a threshold (e.g., in the instance of a weighted integrity check). The indictor on the interface may provide a quick indication of whether the computing device has been compromised, or the system parameters that do not meet a threshold (e.g., in the instance of a weighted integrity check).

Text of the scanning result 762 may be provided to the user. The text of the interface 790 may allow additional information be provided to the user, provisioner, etc. of the device. For example, the text may indicate that the current scan did detect a compromise, and the user, provisioner, etc. of the device may wish to provide immediate attention to the compromise. Action may be taken by the computing device (e.g., the computing device may be powered off) to prevent and/or reduce unauthorized access to the computing device. If the computing device is powered off, e.g., the user may contact a security personnel to determine future action. In other examples, the interface may provide that the scan detected a compromise, but the problem may be corrected at a later time using a defined solution.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A computing device having a closed operating system defining a user portion of the closed operating system and a system portion of the closed operating system, the closed operating system being configured to disallow user access to an identity of system folders or files in the system portion, the computing device comprising:

a processor circuitry configured to:

determine, via an integrity checking module on the user portion of the closed operating system, a predefined set of device integrity parameters, wherein the set of device integrity parameters comprise at least one parameter associated with a file stored on the system portion of the closed operating system;

perform, via the integrity checking module on the user portion of the closed operating system, an integrity check based on the predefined set of device integrity parameters, wherein the integrity check is configured to submit a query for information associated with the at least one parameter associated with the file stored on the system portion of the closed operating system, wherein the query comprises a file name, a file directory, and the at least one parameter associated with the file to the system portion of the closed operating system, which is configured to disallow queries to provide access to the identity of the file name or the file directory of the system portion of the closed operating system to the user portion of the closed operating system, and receive a response to the query that includes the information associated with the at least one parameter that is associated with the file; and provide an indication of a potential compromise to an integrity of the computing device based on the integrity check.

2. The computing device of claim 1, wherein the integrity check is a baseline integrity check.

3. The computing device of claim 2, wherein the processor circuitry is further configured to:

store, at the user portion of the closed operating system, baseline integrity values of the predefined set of device integrity parameters resulting from the baseline integrity check;

perform, via the integrity checking module on the user portion of the closed operating system, a subsequent integrity check based on at least a subset of the predefined set of device integrity parameters, wherein the subset of the predefined set of device integrity parameters comprises the at least one parameter associated with the file stored on the system portion of the closed operating system; and compare integrity values associated with the subsequent integrity check with the baseline integrity values.

4. The computing device of claim 1, wherein the predefined set of device integrity parameters comprises at least one of a device hardware version, a device firmware version, a device software version, or a kernel version.

5. The computing device of claim 1, wherein the predefined set of device integrity parameters comprises at least one of a modification of the password file, a modification of a network services file, or a detection of malware.

6. The computing device of claim 1, wherein the processor circuitry is configured to perform the integrity check on a periodic basis.

7. The computing device of claim 1, wherein the processor circuitry is configured to perform the integrity check on an aperiodic basis.

8. The computing device of claim 1, wherein the processor circuitry is configured to perform the integrity check using a signature function or hashing function to generate integrity values for the predefined set of device integrity parameters.

9. The computing device of claim 1, wherein the processor circuitry is configured to take an action to prevent or reduce an unauthorized access to the system folders or files in response to the potential compromise.

10. The computing device of claim 9, wherein the action is to power off the computing device or provide an interface on a display of the computing device that indicates that the potential compromise has been detected.

11. A method for integrity checking a computing device having a closed operating system defining a user portion of the closed operating system and a system portion of the closed operating system, the closed operating system being configured to disallow user access to an identity of system folders or files in the system portion, the method comprising:

determining, via an integrity checking module on the user portion of the closed operating system, a predefined set of device integrity parameters, wherein the set of device integrity parameters comprise at least one parameter associated with a file stored on the system portion of the closed operating system;

performing, via the integrity checking module on the user portion of the closed operating system, an integrity check based on the predefined set of device integrity parameters, wherein performing the integrity check comprises:

submitting a query for information associated with the at least one parameter associated with the file stored on the system portion of the closed operating system, wherein the query comprises a file name, a file directory, and the at least one parameter associated with the file to the system portion of the closed operating system, which is configured to disallow queries to provide access to the identity of the file name or the file directory of the system portion of the closed operating system to the user portion of the closed operating system; and receiving a response to the query that includes the information associated with the at least one parameter that is associated with the file; and providing an indication of a potential compromise to an integrity of the computing device based on the integrity check.

12. The method of claim 11, wherein the predefined set of device integrity parameters comprises at least one of a modification of the password file, a modification of a network services file, or a detection of malware.

13. The method of claim 11, wherein the integrity check is performed on a periodic basis.

14. The method of claim 11, wherein the integrity check is performed on an aperiodic basis.

15. The method of claim 11, wherein the integrity check is performed using a signature function or hashing function to generate integrity values for the predefined set of device integrity parameters.

16. The method of claim 11, further comprising taking an action to prevent or reduce an unauthorized access to the system folders or files in response to the potential compromise.

17. The method of claim 16, wherein the action is to power off the computing device or provide an interface on a display of the computing device that indicates that the potential compromise has been detected.

18. The method of claim 11, wherein the predefined set of device integrity parameters comprises at least one of a device hardware version, a device firmware version, a device software version, or a kernel version.

19. The method of claim 11, wherein the integrity check is a baseline integrity check.

20. The method of claim 19, further comprising:
storing, at the user portion of the closed operating system, baseline integrity values of the predefined set of device integrity parameters resulting from the baseline integrity check;
performing, via the integrity checking module on the user portion of the closed operating system, a subsequent integrity check based on at least a subset of the predefined set of device integrity parameters, wherein the subset of the predefined set of device integrity parameters comprises the at least one parameter associated with the file stored on the system portion of the closed operating system; and
comparing integrity values associated with the subsequent integrity check with the baseline integrity values.

* * * * *